(12) United States Patent
Matyear

(10) Patent No.: US 10,243,510 B2
(45) Date of Patent: Mar. 26, 2019

(54) ILLUMINATION PANEL

(71) Applicant: PIXALUX INNOVATIONS PTY LTD., Dapto, New South Wales (AU)

(72) Inventor: John Matyear, Kiama (AU)

(73) Assignee: PIXALUX INNOVATIONS PTY LTD, Dapto, New South Wales (AU)

( * ) Notice: Subject to any disclaimer, the term of this patent is extended or adjusted under 35 U.S.C. 154(b) by 0 days.

(21) Appl. No.: 14/729,217

(22) Filed: Jun. 3, 2015

(65) Prior Publication Data

US 2015/0279251 A1 Oct. 1, 2015

Related U.S. Application Data

(63) Continuation-in-part of application No. 13/258,034, filed as application No. PCT/AU2010/000339 on Mar. 24, 2010, now abandoned.

(30) Foreign Application Priority Data

Mar. 25, 2009 (AU) .............................. 2009901272

(51) Int. Cl.
*G09F 13/04* (2006.01)
*H02S 40/30* (2014.01)
(Continued)

(52) U.S. Cl.
CPC .......... *H02S 40/30* (2014.12); *B32B 37/0084* (2013.01); *H02S 40/38* (2014.12); *A47B 2220/0077* (2013.01); *B32B 37/04* (2013.01); *B32B 37/1292* (2013.01); *B32B 37/18* (2013.01); *B32B 38/0008* (2013.01); *B32B 2307/40* (2013.01); *B32B 2307/412* (2013.01);
(Continued)

(58) Field of Classification Search
None
See application file for complete search history.

(56) References Cited

U.S. PATENT DOCUMENTS

| 5,390,436 A | 2/1995 | Ashall .............................. 40/546 |
| 5,422,972 A | 6/1995 | Chambers et al. ............. 385/90 |

(Continued)

FOREIGN PATENT DOCUMENTS

| CN | 1013881 | 10/1989 | ............... C21D 1/76 |
| CN | 2512074 | 9/2002 | ............. G02F 13/18 |

(Continued)

OTHER PUBLICATIONS

International Search Report for International Application No. PCT/AU2010/000339, dated May 4, 2010.

(Continued)

*Primary Examiner* — Kristina N Junge
(74) *Attorney, Agent, or Firm* — Pearne & Gordon LLP

(57) ABSTRACT

An illumination panel includes a transparent structural core having two opposing surfaces, a matrix of light releasing dots substantially covering both the opposing surfaces, and a protective panel in abutting contact with each of the opposing surfaces whereby the dots are an adhesive for bonding the core to the protective panels and wherein the density or size of the dots increases across the illumination panel in a direction away from an illumination panel edge adjacent a light emitting element.

26 Claims, 11 Drawing Sheets

(51) Int. Cl.

| | | |
|---|---|---|
| *H02S 40/38* | (2014.01) | |
| *B32B 37/00* | (2006.01) | |
| *B32B 37/12* | (2006.01) | |
| *B32B 38/00* | (2006.01) | |
| *B32B 37/18* | (2006.01) | |
| *B32B 37/04* | (2006.01) | |
| *F21V 33/00* | (2006.01) | |
| *G09F 27/00* | (2006.01) | |
| *F21Y 115/10* | (2016.01) | |

(52) U.S. Cl.
CPC ... *B32B 2307/416* (2013.01); *B32B 2307/418* (2013.01); *B32B 2307/422* (2013.01); *B32B 2310/0825* (2013.01); *B32B 2310/0831* (2013.01); *B32B 2310/0843* (2013.01); *B32B 2310/0862* (2013.01); *B32B 2310/0887* (2013.01); *B32B 2457/12* (2013.01); *B32B 2457/20* (2013.01); *B32B 2479/00* (2013.01); *F21V 33/0012* (2013.01); *F21Y 2115/10* (2016.08); *G09F 13/04* (2013.01); *G09F 27/007* (2013.01)

(56) References Cited

U.S. PATENT DOCUMENTS

| | | | |
|---|---|---|---|
| 5,649,754 A | 7/1997 | Matsumoto | 362/618 |
| 5,915,855 A | 6/1999 | Murase et al. | 40/546 |
| 6,208,466 B1 | 3/2001 | Liu et al. | 359/854 |
| 6,210,013 B1 | 4/2001 | Bousfield | 362/92 |
| 6,217,186 B1 | 4/2001 | Fisher | 362/31 |
| 6,905,220 B2 | 6/2005 | Wortman et al. | 362/627 |
| 6,918,679 B2 | 7/2005 | Wu | 362/127 |
| 8,279,371 B2 | 10/2012 | Song et al. | 349/65 |
| 8,350,782 B2 | 1/2013 | Daniel et al. | 345/55 |
| 2003/0231483 A1 | 12/2003 | Higashiyama | 362/31 |
| 2007/0078216 A1* | 4/2007 | Cao | C08K 3/0033 524/497 |
| 2007/0256340 A1 | 11/2007 | Kim | 40/541 |
| 2008/0037272 A1 | 2/2008 | Song et al. | 362/561 |
| 2008/0094700 A1 | 4/2008 | Uehara | 359/463 |
| 2010/0000134 A1 | 1/2010 | MacKler | 40/492 |
| 2010/0067257 A1 | 3/2010 | Meis et al. | 362/624 |
| 2010/0157406 A1 | 6/2010 | Gruhlke et al. | 359/238 |
| 2010/0316816 A1 | 12/2010 | Husemann et al. | 428/1.5 |
| 2011/0273906 A1* | 11/2011 | Nichol | G02B 6/0076 362/607 |

FOREIGN PATENT DOCUMENTS

| | | | | |
|---|---|---|---|---|
| CN | 2526933 | 12/2002 | | G09F 13/00 |
| CN | 1469075 | 1/2004 | | F21V 8/00 |
| CN | 2708435 | 7/2005 | | G09F 13/00 |
| CN | 1854774 | 11/2006 | | G02B 6/00 |
| CN | 101078836 | 11/2007 | | G02F 1/13357 |
| CN | 101131498 | 2/2008 | | G02F 1/1335 |
| CN | 101216573 | 7/2008 | | G02B 6/00 |
| CN | 201117199 | 9/2008 | | G09F 15/02 |
| CN | 101388163 | 3/2009 | | G09F 13/04 |
| JP | S55-67783 | 5/1980 | | G09F 9/00 |
| JP | H04-191704 A | 7/1992 | | F21S 2/00 |
| JP | 10-021720 | 1/1998 | | F21V 8/00 |
| JP | 10011001 | 1/1998 | | G02F 1/1335 |
| JP | H1011001 | 1/1998 | | G09F 13/18 |
| JP | H11-184416 A | 7/1999 | | G09F 13/18 |
| JP | 2001-503189 A | 3/2001 | | F21V 8/00 |
| JP | 2002-328633 | 11/2002 | | G02B 6/00 |
| JP | 2007-140142 | 6/2007 | | G09F 13/18 |
| JP | 2008-041270 A | 2/2008 | | F21V 8/00 |
| WO | WO 92/05535 | 4/1992 | | G09F 13/18 |

OTHER PUBLICATIONS

Chinese Office Action (dated August 28, 2013), issued in corresponding Chinese Patent Application No. 201030013480.5, with English language translation.

Japanese Office Action (dated December 10, 2013), issued in corresponding Japanese Patent Application No. 2012-501082, with English language translation.

* cited by examiner

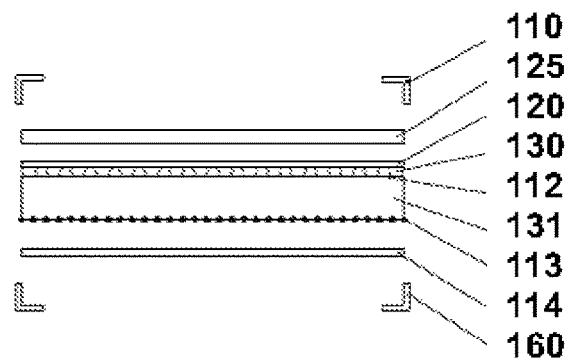
FIGURE 1a(i) – PRIOR ART
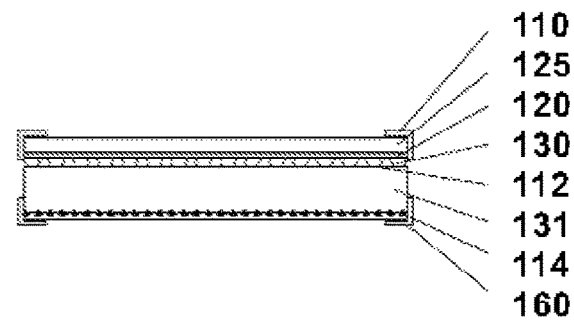
FIGURE 1a(ii) – PRIOR ART

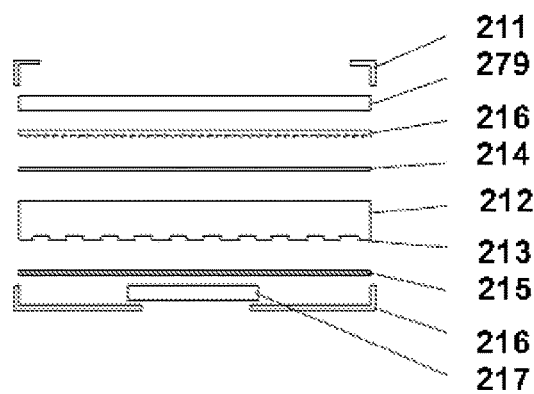
FIGURE 1b(i) – PRIOR ART
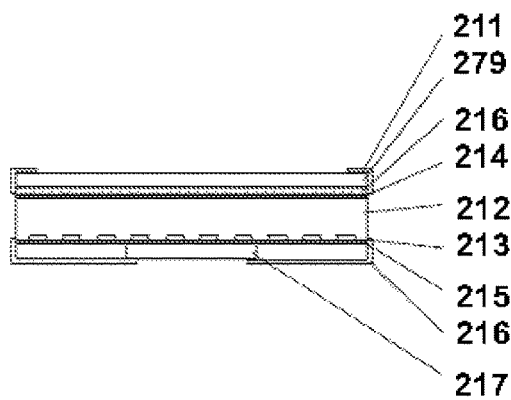
FIGURE 1b(ii) – PRIOR ART

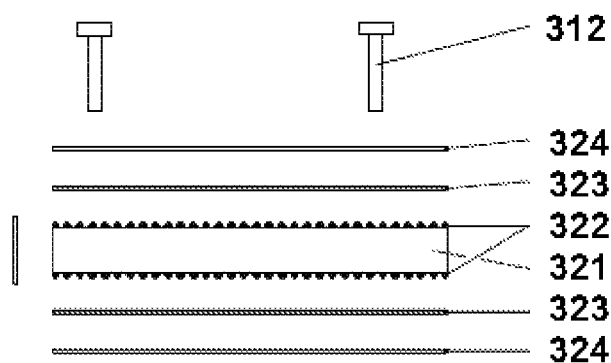
FIGURE 1c(i) – PRIOR ART
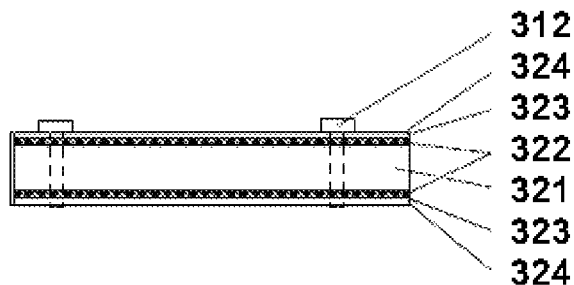
FIGURE 1c(ii) – PRIOR ART

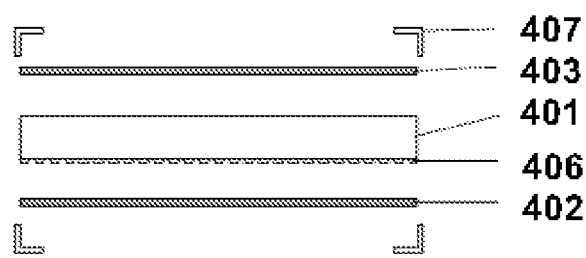
FIGURE 1d(i) – PRIOR ART
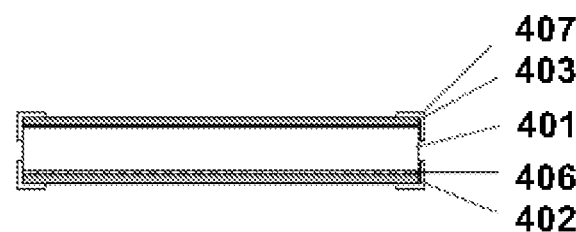
FIGURE 1d(ii) – PRIOR ART

ILLUMINATION PANEL

RELATED APPLICATIONS

This application is a continuation-in-part of U.S. patent application Ser. No. 13/258,034, filed Sep. 21, 2011, which is a U.S. National Stage Application of International Application No. PCT/AU2010/000339, filed Mar. 24, 2010, which claims priority from AU 2009901272, filed Mar. 25, 2009, said patent applications hereby fully incorporated herein by reference.

FIELD OF THE INVENTION

This invention relates to an illumination panel and, in particular, a panel for use in building and display applications including illuminated signage.

BACKGROUND OF THE INVENTION

Illuminated signage, advertising and display boards are in popular use across the world. These signs usually incorporate discrete lighting which has the effect of illuminating the whole of the sign. There have been a number of past suggestions for using translucent plastics with edge lighting whereby the light is released by a matrix of dots to fully and evenly illuminate the entire surface area of the sign. Well known arrangements of this type of sign utilise an acrylic panel that has printed thereon a graded matrix of ink dots on one or both faces of the panel.

The dots of ink affect the refractive and reflective nature of the acrylic and allow light introduced along an edge of the panel to be released across the whole surface area of the panel. When the dots are carried on both sides, the light reflects and refracts more effectively through both surfaces. In one option, a reflective film or sheet is placed on one side causing the light released on that side to be reflected back through the panel so the majority of light leaves the panel only through one ("front") surface.

The same process of controlled, even light release can be achieved by laser etching the surface of an acrylic panel.

A problem with lighting systems of the kind described above is that the acrylic panel which carries the matrix of printed dots or laser etching has to be handled very carefully. If the panel becomes scratched or subjected to moisture, light escapes as bright spots thereby upsetting the even light distribution across the surface of the panel. The vulnerability of the surfaces of the acrylic panel reduces the effective use of such panels.

Furthermore, these panels cannot by themselves, operate as structural elements. In order to be used as structural elements they must incorporate a supporting skeleton such as an edge frame.

Other, small non-structural illumination panels are also used as illuminating screens for liquid crystal displays in devices such as calculators and mobile phones. The planar elements of these panels are typically held together by the calculator or phone casing, or some other mechanical means such as screws.

It is consideration of the problems associated with these structures that has brought about the present invention.

SUMMARY OF THE INVENTION

According to one aspect of the present invention there is provided an illumination panel comprising a transparent structural core having two opposing surfaces, a matrix of light releasing and distributing dots substantially covering both said opposing surfaces, and a protective panel in abutting contact with each of said opposing surfaces whereby the dots are an adhesive for bonding the core to each of the protective panels and wherein the density or size of the dots increases across the illumination panel in a direction away from an illumination panel edge adjacent a light emitting element.

The transparent structural core, protective panel and adhesive dots therebetween thus form an integral structure.

Where used herein, the term "light releasing dots" is intended to include the effect of light reflecting and refracting from dots on the surface of a transparent structural core. As such, the surface of the panel is fully and evenly illuminated.

The matrix of dots may be applied to the transparent core by etching, painting, screen printing, printing or spraying or any one of a number of application techniques such as transfer from a film or even as part of a film or panel that then becomes the protective panel.

Alternatively, the matrix of dots may be provided by localized spot applications of energy, such as laser energy from a laser, or high frequency ultrasonic acoustic vibration from a sonotrode.

In a preferred embodiment the array of dots may be provided by laser etching the surface of the panel to define the array of dots while also bonding the protective layer to the core.

Preferably, the core is acrylic and the protective panel may be any suitable material that will bond to the core via the medium of the dots. The protective panels protect the core surface so the light distribution established by the matrix of dots remains fixed and the core is protected from further contact.

In one embodiment the protective panels bonded to the core are both diffuser panels. In another embodiment, a reflective protective panel is attached to one side of the core with a diffuser panel attached to the other. Preferably, when the protective panel is a diffuser panel it comprises glass, acrylic, polycarbonate or various translucent plastic materials. The protective panel may be extremely thin, in the form of a film. Preferably when the protective panel is a reflector panel it comprises a plastic material such as acrylic, high impact polystyrene, or glass, metal such as aluminium composite or a laminate such as the acrylic and polyester surfacing provided under the Laminex® trade mark.

In accordance with a still further aspect of the present invention there is provided a method of producing an illumination panel of the present invention, the method comprising the steps of placing a protective panel in abutting parallel contact with a transparent core and establishing a matrix of light releasing dots by applying energy through the protective panel onto the surface of the core to adhere the protective panel to the core and provide light distribution across the transparent structural core.

The activating energy may be, for example, laser energy, heat (thermal, IR etc) or ultrasonic energy.

The dots described above can be of any size or shape and are, for example, square, round, linear, rectangular, triangular, doughnut, or any other shape, even an irregular shape. The dots may be clear, translucent or opaque and, more preferably, light coloured, for example, white. The light releasing dots may increase along the panel in density, size or combinations thereof across the panel in a direction away from a light source applied to one or more edges of the panel.

The illumination panel of the present invention is suitable for a wide range of applications where a structural illumination panel is required. Applications for which the illumination panel of the present invention may be included as a structural element include: shelves for bookcases or display frames, panels for cabinets such as cupboards, open displays or refrigerators, signs including road signs and advertising signs, and splashbacks such as those used in kitchens and bathrooms.

The illumination panel of the present invention is particularly well adapted for use with light sources such as light emitting diodes (LEDs) which can be located adjacent an edge or one or more edges of the panel. The light source may be powered by any convenient power source, such as mains electricity, battery or solar power.

In another aspect of the present invention there is provided an illuminated solar powered panel comprising a transparent structural core having two opposing surfaces, a first matrix of light releasing dots and a second matrix of light releasing dots substantially covering both said opposing surfaces and a protective panel of reflective material in abutting contact with the uppermost of the opposing surfaces, whereby the first matrix of light releasing dots are an adhesive for bonding the core to the protective panel and wherein the density or size of the dots in the first matrix increases across the panel in a direction away from a panel edge said protective panel carrying a plurality of solar cells whereby the solar cells generate electricity that is passed to a battery pack or accumulator and power from the battery pack or accumulator is fed back to a light source positioned along at least one edge of the panel to allow light to be introduced and distributed by the first matrix of dots and released through a diffuser bonded to the lowermost surface of the core by the second matrix of light releasing dots.

Preferably, the protective panel consists of solar film or solar cells. For example the solar film may be the protective panel. Alternatively the protective panel may comprise solar film or solar cells. For example, solar film or solar cells may be bonded to a surface of the protective panel.

In a preferred embodiment, the protective panel comprises or consists of solar cells with the rear surface treated or painted to act as a reflector.

In essence, embodiments of the present invention stem from the realisation that, contrary to the teaching of the prior art, it is possible to remove the frame or case used to hold components of the light generating panel together, and achieve the protection of the wave guide surfaces by bonding the diffuser and reflector to the wave guide by a matrix of light releasing and reflecting adhesive dots. This releases the edge light panel elements from the need for a frame and allows the panel to be used for a multitude of new applications. Because the panel components are bonded together, the panel becomes structural as well as illuminating, and this is a very practical and highly innovative development.

Advantages provided by illumination panels according to the present invention include the following: the panels are structural and can be used without frames; during manufacture, the panels can be finished using well known techniques such as laser cutting, sawing, edge-banding, pre-milling and corner rounding and edge routing; the panels can be manufactured in a wide range of sizes and laser cut to any desired shape; the panel manufacturing process can be straightforward and economical.

DESCRIPTION OF THE DRAWINGS

Embodiments of the present invention will now be described by way of example only with reference to the accompanying drawings in which:

FIGS. 1a(i)-1d(ii) comprise cross sectional plan views of illumination panels of the prior art (FIGS. 1a, 1b, 1c and 1d) in both (i) exploded, and (ii) assembled conformations. The prior art illumination panels are those disclosed and taught in US 2008/0037272 by Song et at (FIGS. 1a(i) and 1a(ii)), US 2003/0231483 by Higashiyama (FIGS. 1b(i) and 1b(ii)), U.S. Pat. No. 6,918,679 by Wu (FIGS. 1c(i) and 1c(ii)) and JP 100 21720 (FIGS. 1d(i) and 1d(ii)).

DESCRIPTION OF THE PREFERRED EMBODIMENTS

An illumination panel essentially comprises a transparent sheet of clear acrylic plastics with at least one surface covered with a matrix of spaced light refracting and reflecting dots. When light is introduced to the appropriate edges of the panel it is refracted and reflected by the dots and released to illuminate the whole surface of the panel. Patent Application No. WO 92/05535 is an example of this kind of illumination panel. However, it has not hitherto been known to use the dots to adhere adjacent elements of the panel to make them integral.

Figure 2A:
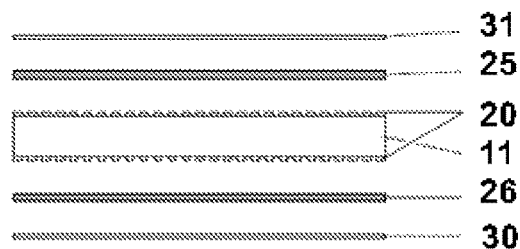
FIGS. 2a and 2b are views of a double sided illumination panel according to the present invention in exploded plan view (FIG. 2a) and in cross section (FIG. 2b). In contradistinction to the prior art of FIGS. 1a(i)-1d(ii), the illumination panel of FIGS. 2a and 2b have a core 11 having opposed surfaces 12 and 13, each of which is covered by a matrix of opaque, translucent or clear dots 20 that adhere protective panels 25, 26 to both opposed surfaces 12 and 13. In further contradistinction to the prior art of FIGS. 1a(i)-1d(ii), no frame or casing is required to hold the panel together.
Figure 2B:
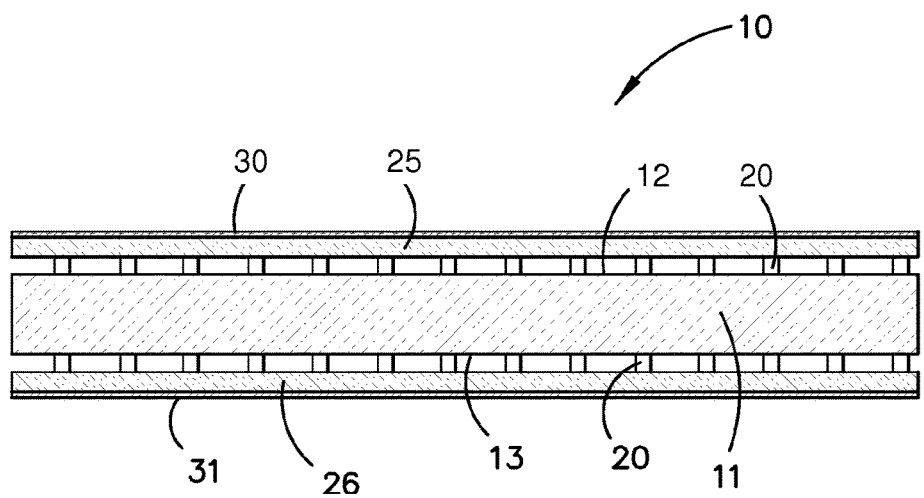

In the following paragraphs an embodiment of the present invention as depicted in FIGS. 2a and 2b will be described and explained by contrasting with typical illumination panels of the prior art, specifically, US 2008/0037272 by Song et al (FIGS. 1a(i) and 1a(ii)), US 2003/0231483 by Higashiyama (FIGS. 1b(i) and 1b(ii)), U.S. Pat. No. 6,918,679 by Wu (FIGS. 1c(i) and 1c(ii)) and JP 100 21720 (FIGS. 1d(i) and 1d(ii)).

FIGS. 2a and 2b show an illumination panel 10 in accordance with the embodiments of the present invention in exploded plan view (FIG. 2a) and in cross section (FIG. 2b).

Each illumination panel 10 comprises a core 11 of transparent acrylic acting as a light guide panel which is usually 6 mm, 8 mm or 10 mm in thickness. The core may include an optical brightener. The core 11 can have any surface sectional area and, although shown planar in FIGS. 2a and 2b, could be appropriately curved. The acrylic core 11 has opposed surfaces 12 and 13, each of which is covered by a matrix of opaque, translucent or clear glue dots 20. The matrix of glue dots 20 is an adhesive to secure a protective panel 25, 26 to both sides of the core 11. The protective panel may, for example be a diffuser sheet and/or reflector sheet.

If required, a layer 30, 31 can optionally be added to the outer side of the protective panels 25, 26. It is understood that the layer 30, 31 may be any material such as glass, timber, metal, paint, ink, photographic film or veneer which could be attached to the protective panel 25, 26 for various purposes, for example painting or veneering a surface to match the surroundings, or printing signs and images. The surfaces of the protective panels 25, 26 may also be left untreated, simply allowing the light to release for general illumination.

The important feature of this embodiment is that the matrix of adhesive dots 20 acts as a light transmitting, refracting and reflecting medium as well as an adhesive, firmly securing the protective panel 25 to the core 11 and protecting the core and dot matrix from damage, for example, by scratching or moisture while also providing a light transmitting surface that can be used without affecting light distribution from the core. The glue is of a light reflecting, refracting or transmitting material and it is understood that there are a large variety of different glues which are suitable.

The matrix of adhesive dots may be applied in many different ways including by etching, painting, printing, screen printing or spraying or transferred from a film or even as part of a film or layer that is then fixed to the core by the adhesive dots.

Alternatively, the matrix of dots may be provided by localized spot applications of energy, such as laser energy from a laser, or high frequency ultrasonic acoustic vibration from a sonotrode.

For example, a laser can be used to etch the surface of the core 11 through the protective panel 25 to define the array of dots whilst, at the same time, bonding the protective panel to the core. Laser etching by focusing a laser beam on the surface of a material is a method that is well known to those skilled in the art for marking a surface. When the laser energy and the speed of laser movement across a target material is correctly adjusted for the type and thickness of the material, the surface of the material at the focal point of the laser beam will be changed or 'etched'.

Where used herein the term 'laser etching' is intended to mean the application of sufficient laser energy to etch the surface of the core, that is, melt and mark to create a matrix of light diffusing dots and at the same time bond a protective panel or film to the core.

The laser energy is adjusted by controlling the overall energy delivered from the laser (0-100%) and the speed at which the beam is passed over the material. Typically, for example, when using an 80 micron laminating polyester film, a 400 watt laser is adjusted to 8% power, and moving at 1 meter per second can effectively etch and bond the film to the core.

Alternatively the matrix of dots may be provided by providing high frequency ultrasonic acoustic vibrations to create dots while ultrasonically welding the surface of the core to the protective panel.

The process might also be achieved by laying an appropriate film between the core and protective panel and under laser activation, have the film bond to both surfaces in an array of light transmitting dots.

The invention of the present application can be contrasted with the inventions of US 2008/0037272 by Song et al (FIGS. 1*a*(i) and 1*a*(ii)), US 2003/0231483 by Higashiyama (FIGS. 1*b*(i) and 1*b*(ii)), U.S. Pat. No. 6,918,679 by Wu (FIGS. 1*c*(i) and 1*c*(ii)) and JP 10021720 (FIGS. 1*d*(i) and 1*d*(ii)). The prior art examples are shown in exploded plan view (FIGS. 1*a*(i), 1*b*(i), 1*c*(i) and 1*d*(i)) and in corresponding assembled cross sectional view (FIGS. 1*a*(ii), 1*b*(ii), 1*c*(ii) and 1*d*(ii)).

As illustrated in FIGS. 1*a*(i) and 1*a*(ii), the invention of Song et al includes liquid crystal display elements (LCDs) 125, diffuser 120, Light collecting layer 130, light emission surface 112, light guide plate 131, Light reflection surface 113, a reflector plate 114 to fully reflect light released from the light guide plate 131.

In use, all the elements of the panel of Song et al are held together in the upper 110 and lower casing 160, that is, within a frame. If the frame were to be removed, only the diffuser 120, light collecting layer 130 and light guide plate 131 would remain and the panel would not function because light would be lost through the light reflection surface 113 which would also be exposed and thus vulnerable to damage.

The panel of Song et al (FIGS. 1*a*(i) and 1*a*(ii)) is intended for gathering and guiding light from an edge lit panel onto an LCD screen. The invention is directed to removing the need for providing a plurality of optical sheets between the light guiding plate and the liquid crystal display to diffuse and focus light. The device of Song et al is made by contacting a base film printed with a clear, wet UV activated resin against a light guide plate in such a manner as to ensure that there is more surface contact of the resin to the base film than to the light guide plate. Song et al does not include a matrix of light releasing dots nor a matrix of dots used as an adhesive for bonding two surfaces together. Furthermore, the device of Song et at is one-sided and is held to the loose reflector plate by a frame.

Thus Song et al constructs an optical plate from a light guide plate, a base film and a light collecting layer. The light collecting layer is not a light reflecting and refracting layer. This action is carried out by the reflection surface 113 of the light guide plate. Various patterns may be formed on reflection surface 113 including a dot pattern, a V-cut groove, a prism pattern or the like. The light collecting layer is made using clear resin, and the resin is laid down on the base film at an increasing density away from the light source in the light guide plate. So also are the dot pattern, V-cut groove pattern, prism pattern or the like that are reflecting the light in the light guide plate. That is, the further away from the light source, the denser the light reflecting elements on the rear surface of the light guide 131. Therefore, more light collecting patterns are required to collect the light on the light emission surface 112. However, any dots are not an adhesive for bonding to the reflector.

In another example of the prior art, the panel of Higashiyama is depicted in FIGS. 1*b*(i) and 1*b*(ii). The panel per se comprises a main LCD screen 279, a prism sheet 216 a diffusion layer 214 to diffuse and reflect light, a light guide plate 212 having a diffusion surface 213, a white semi-transparent reflective layer 215 and a second LCD 217. The panel is intended for use in a small device such as a mobile phone and the components of the panel are held together by a frame in the form of the phone case—the top 211 and bottom 216 of which can be seen in FIGS. 1*b*(i) and 1*b*(ii). If the case were to be removed, only the light guide plate 212 with diffusion surface 213 would remain leaving the panel unable to diffuse light, with the diffusion and light releasing surfaces exposed and vulnerable to damage.

Higashiyama (FIGS. 1*b*(i) and 1*b*(ii)) discloses an illumination panel that uses a light guide plate with a single-sided diffusion surface, an embossed surface of fine projections and transparent resin films disposed on either side thereof. The resin films are for diffusing and reflecting light so more light will be released from a front surface of a light source device than from a rear surface thereof.

The panel of Higashiyama has an air layer interposed between the diffusion layer 214 and a front facing surface of the light guide plate 212 and the embossed surface 213 and the semi-transparent reflector 215. The panel is designed to selectively deliver more light to the front facing surface so that the main LCD screen of the phone receives the most light, while a secondary smaller screen on the rear surface of the phone can be illuminated by a lower transmission of light from the light guide plate 212. There is no teaching or use of adhesive dots in the Higashiyama panel.

In another example of the prior art, the panel of Wu is depicted in FIGS. 1c(i) and 1b(ii). The panel comprises a light guide panel 321 having light deflection parts 322 on its upper and lower surfaces. Reflector or diffuser sheets 323 and transparent plates 324 are also in place on either surface of the light guide panel 321, the panel being held together by screws 312 and brackets 411.

Unlike the panel of the present invention, the prior art panel of Wu uses mechanical means (screws and brackets) to hold components adjacent or in contact with the core. If the screws were to be removed, only the light guide panel 321 and light deflection parts 322 would remain attached to the core, but light would not be diffused and the light deflection parts and both surfaces of the wave guide would be exposed and vulnerable to damage.

In another example of the prior art, the panel of JP 100 21720 is depicted in FIGS. 1d(i) and 1d(ii). This panel is used in a lap top or portable computer and includes a diffuser sheet 403, a light guide panel 401, adhesive light deflection parts 406 and a reflector sheet 402. In the absence of any mechanical fixing or case 407, only the light guide 401, reflector sheet 402 and adhesive light deflection parts 406 would remain attached to the core and light would not be diffused and the light releasing side of the light guide panel would be exposed making it vulnerable to damage.

Specifically, prior art edge illuminated light guide panels have principally been used for illuminating signs and LCD display panels for calculators, cameras, portable computers, television sets and mobile phones. Much refinement of edge light panels has taken place over the last 15 years, particularly relating to LCD television sets and portable computers.

There are three basic elements that commonly make up a single sided edge light panel systems of the prior art for the abovementioned devices—a wave guide panel that distributes and releases light, a reflector to send light released from the panel in one direction, and a diffuser to provide a "usable" spread of diffused light.

The wave guide is the key component and operates by releasing light evenly across either one or both planer surfaces. This is normally achieved by applying a matrix of dots or laser etched lines that increase in area or number in a direction away from the light source, and when done correctly, light is released evenly.

Waveguides are typically made from acrylic. For example the acrylic used typically has a refractive index of approximately 1.45 which is higher than air, so light introduced into the edge of a clear, untouched acrylic panel will pass through the panel and out the other side, as the light is internally reflected at the acrylic-air interface. Any marks, scratches, moisture or finger prints change the reflective and refractive nature of the wave guide surface and this results in light being released, so both surfaces of the wave guide need to be protected from any contact or surface contamination once the correct light distribution has been established.

The surfaces of the wave guides used within the above devices remain protected because they are sandwiched between the reflector and diffuser and all the elements are held together in a frame or case to allow the system to work.

While the various wave guides will function outside the cases or frames they are held within, that is, will act to distribute light from their surfaces, the panels are vulnerable to any contact on either surface and therefore are very limited in application. In essence, embodiments of the present invention stem from the realisation that it is possible to remove the frame while providing permanent protection of both the wave guide surfaces by bonding the diffuser and reflector to the wave guide by the matrix of light releasing and reflecting adhesive dots. This releases the edge light panel elements from the need for a frame and allows the panel to be used for a multitude of applications. Because the elements are bonded together, the panel becomes structural as well as illuminating, and this is a very practical and highly innovative development.

One embodiment of the method of producing the illumination panel of the present invention, comprises the step of placing a protective panel in abutting parallel contact with each surface of a transparent structural core and laser etching or activating a matrix of light releasing dots through the protective panel onto the surface of the core to adhere the layer to the core and providing light distribution across the transparent structural core.

Figure 3:
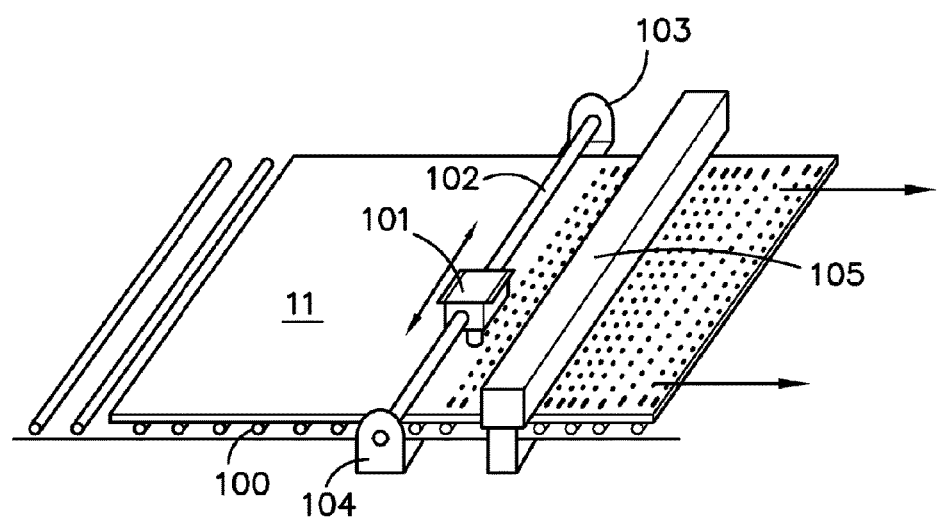
FIG. 3 is a perspective view of the start of a process line for manufacturing the panel of FIGS. 1a(i)-1d(ii)
Figure 4:
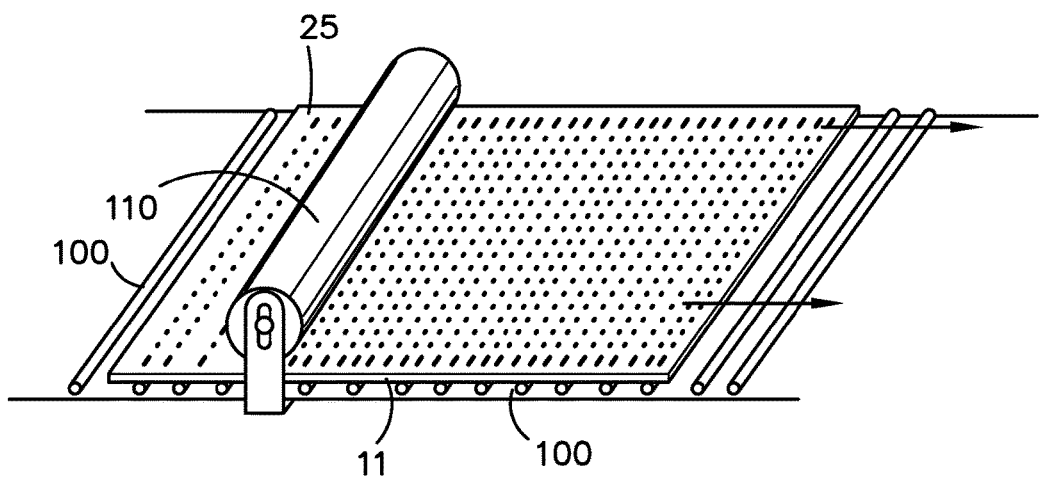
FIG. 4 is a perspective view of part of the process line.

Another embodiment of the method of producing the panel shown in FIGS. 2a and 2b is illustrated in FIGS. 3 and 4. In this embodiment, the core of acrylic plastic 11 is passed along a roller conveyor 100 in the direction of the arrows shown in FIGS. 3 and 4.

An adhesive dispenser 101 is arranged to complete a reciprocal movement along a rod 102 transversely across the conveyor 100. The rod 102 is held by fixed rectangular supports 103, 104. The dispenser 101 places a line of spaced dots of adhesive transversely across one surface of the core, the adhesive preferably containing a small percentage of pigment, typically from 0.5 to 2.0 wt %, depending on the size of the finished panels and the material used for the protective panels. As the core moves forward, the rows of dots are spaced as shown in FIG. 3. The dots of adhesive could also be printed for example, by a glass screen printer such as those sold under the trade mark Keywell™.

Typically the adhesive comprises acrylates. Typically the pigment is a white pigment, such as a titanium dioxide based pigment. Prior to printing, a special hardening formulation is added at 3-5% of adhesive volume and this material assists in cross-linking the adhesive bond to the material used for the protective panel.

Downstream of the dispenser 101 is a UV light 105 which fully or partially cures the adhesive depending on type or process. A commercially available UV curing machine such as those sold under the ADCO trade mark may be suitable. The UV energy source is typically adjusted to deliver from 600 to 900 milijoules/cm2 depending on the level of pigment mixed in the adhesive.

A protective panel 25 is positioned above the first glued surface of the wave guide core in a squaring frame and aligned with the core. The core and protective panel are then pressed together and consolidated by passing through a pressing roller 110 that rotates to exert downward pressure on the panel 25 to bring the cover panel 25 into abutting contact with the dots on the core 11 or the panel can be manually pressed to the dots on the core. The adhered elements are then sent back to have the adhesive applied to the second surface of the wave guide core. The adhesive is again cured under UV light as described above and the panel again placed in the squaring frame where the second protective panel is aligned and pressed into position as described above.

The three elements making up the finished panel are then pressed under a vacuum press at −0.8 to 0.9 Atm, preferably about 0.85 Atm (approximately 8 ton/m2) for 2 to 5 minutes, preferably about 3 minutes.

A significant amount of pressure may be applied, for example, around 30,000 kg on a 2500 mm×1300 mm panel according to the present invention.

It is understood that this process may also be achieved by the adhesive being applied to the protective panels which are then bonded to the cores.

In another method, the adhesive may be printed to the core or protective panel and the two components then pressed together and the adhesive cured by light.

It may also be necessary to alter the surface characteristics of the protective panels prior to bonding in order to have the adhesive and the protective panels to bond firmly. For example, if the protective panels are made from acrylic, polycarbonate or other plastic material, they may be passed through corona discharge plasma to raise the surface energy to preferably between 50 and 55 Dyne/cm2. It may also be helpful to treat the acrylic core in the same way.

The dot matrix substantially covers the surface of the core 11 and operates to control the release of light introduced along one or more sides of the panel 10. It is usual for the density or size of dots, or both to increase along the panel 10 in a direction away from the edge where the light is introduced for a single light source, and when light is introduced from opposite sides of the core panel, the density or size of dots or both increases to a point equal distance from both light sources. To achieve an even light distribution across the core panel, the density of dots can be increased or alternatively, the gaps between the dots can remain constant and the size of the dots increased, or both the density and size of the dots increased.

The dots may comprise a grid work of lines or even concentric circles of differing diameters. The adhesive dots may be any one of a number of adhesive materials including various formulations of UV curing inks and adhesives, and adhesive of clear or white silicon.

Both panels 10 described above are in themselves structural units and thus can be supported or used as wall panels, shelves or in a wide variety of structural environments. The panels do not have to be enclosed within a supporting frame and can, by themselves, operate as structural elements.

In one embodiment, it is envisaged that at least one edge of the panel would have LEDs embedded therein which would operate on low voltage to define a highly illuminated structural element. The panel may also be finished with a dress edge on one or more sides. The LEDs could also be simply attached to one or more edges of the panel by a metal or plastic extrusion, or clips. The dress edge may be made from translucent acrylic to allow light to be released. The advantage of embedding LED lighting into the panel means that, as a structural unit, it is complete. Since LEDs have a long lifespan the panels could be left illuminated for very lengthy periods operating on a low safe voltage without the need of maintenance. The light delivered could be white or any number of different colours available from LED lighting elements.

In another embodiment, the protective panel 25 could be either a light transmitting diffuser panel or a reflective reflector panel. The protective panel could be a suitable material such as plastic, glass, metal or timber such as the acrylic and polyester surfacing provided under the Laminex® trade mark. The surface of the panel 25 that is to be bonded to the core could be painted or treated to define a reflective surface when the panel operates as a reflector.

For example, a white polystyrene or polyethylene panel may be bonded directly to the core 11 with the surface of the plastic reflecting the light released from the core by the glue dots. The opposite side of the core could be bonded to a glass sheet. This arrangement could be used for a kitchen splashback or a glass shelf.

Alternatively, the opposite side of the core could have an opal translucent panel bonded by the matrix of adhesive dots, and used as a single sided sign.

In a further example, a decorative surfacing such as those sold under the trade mark Laminex® may be bonded directly to the core 11 with the inside (or bonding) surface of the veneer having been painted white to reflect light. The veneer then provides the finished external surface while the internal face of the veneer acts to reflect light back through the core and out the opposite surface. This front light releasing surface of the core can be protected by a clear or opal translucent material that is attached by another light releasing matrix of glue dots. This could be the case when the illumination panel is used as the walls and/or base of a cupboard, or a retail display, see FIGS. 5 and 8.

Figure 5:
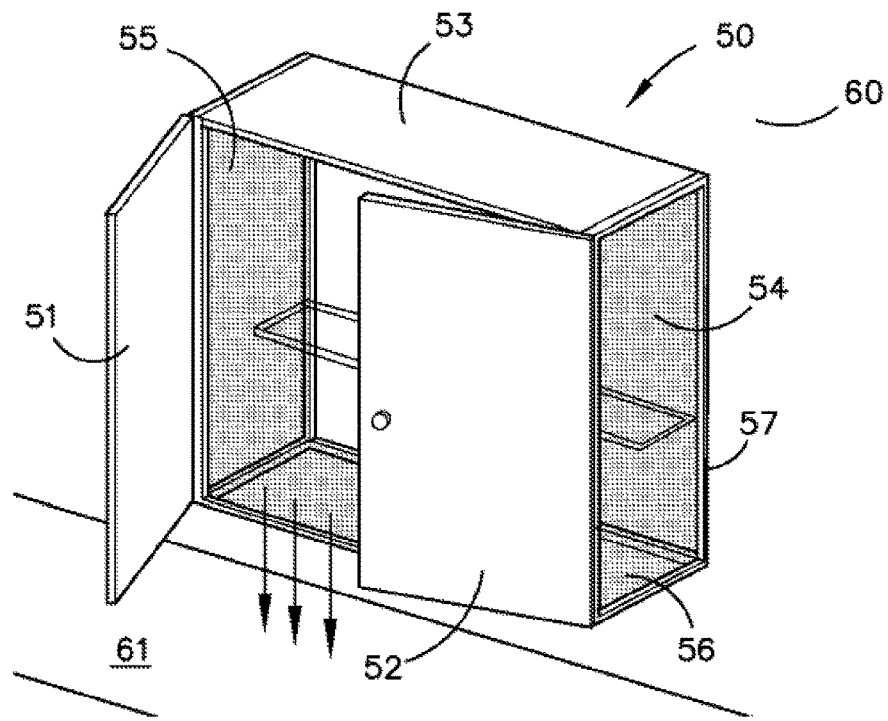
FIG. 5 is a perspective view of a kitchen cabinet incorporating illumination panels of FIGS. 2a and 2b.
Figure 6:
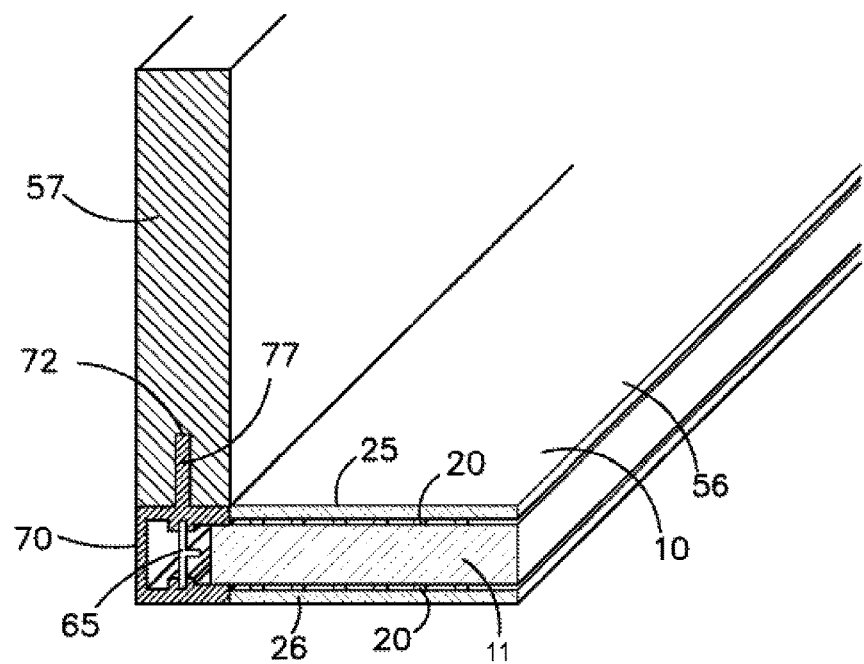
FIG. 6 is a perspective view of an illumination panel of FIGS. 2a and 2b attached to a structural panel.

A rectangular kitchen cupboard 50 is shown in FIGS. 5 and 6, comprising hinged doors 51, 52, a top 53, sides 54, 55, base 56 and rear panel 57. The rear panel 57, top 53 and doors 51, 52 are manufactured of conventional joinery such as plastic or polymer, plywood, timber, chip board or combinations thereof. The base 56 and sides panels 54, 55 are constructed of illuminated panels 10 shown in greater detail in FIG. 6.

In FIG. 5, the cupboard is mounted against a wall 60 above a bench surface 61. Since the side panels and base panels are illuminated panels, light is passed into the interior of the cupboard by the side panels and down onto the bench surface 61 by the base panel 56.

As shown in FIG. 6, each panel 10 comprises an acrylic core 11 with a matrix of dots 20 on either side. The matrix of glue dots secures a reflective cover 25 on one side and a translucent layer 26 on the other side. The edge of the panel has attached thereto an elongated light strip 65 and the light strip, together with the panel, is located within a rectangular aluminium extrusion 70. The extrusion 70 has an upstanding web 77 which is keyed into a slot 72 in the panel 57 which constitutes the timber, veneer or laminated structural rear panel 57 of the cabinet.

The side panels may transmit light either internally into the cabinet or on both sides and the base panel is designed primarily to transmit light to the underside. A single or dual light source is located along the rear and or front edges and a reflective covering is placed on the top side. Where the light travels in both directions it is understood that translucent panels would be used on both sides.

Figure 7:
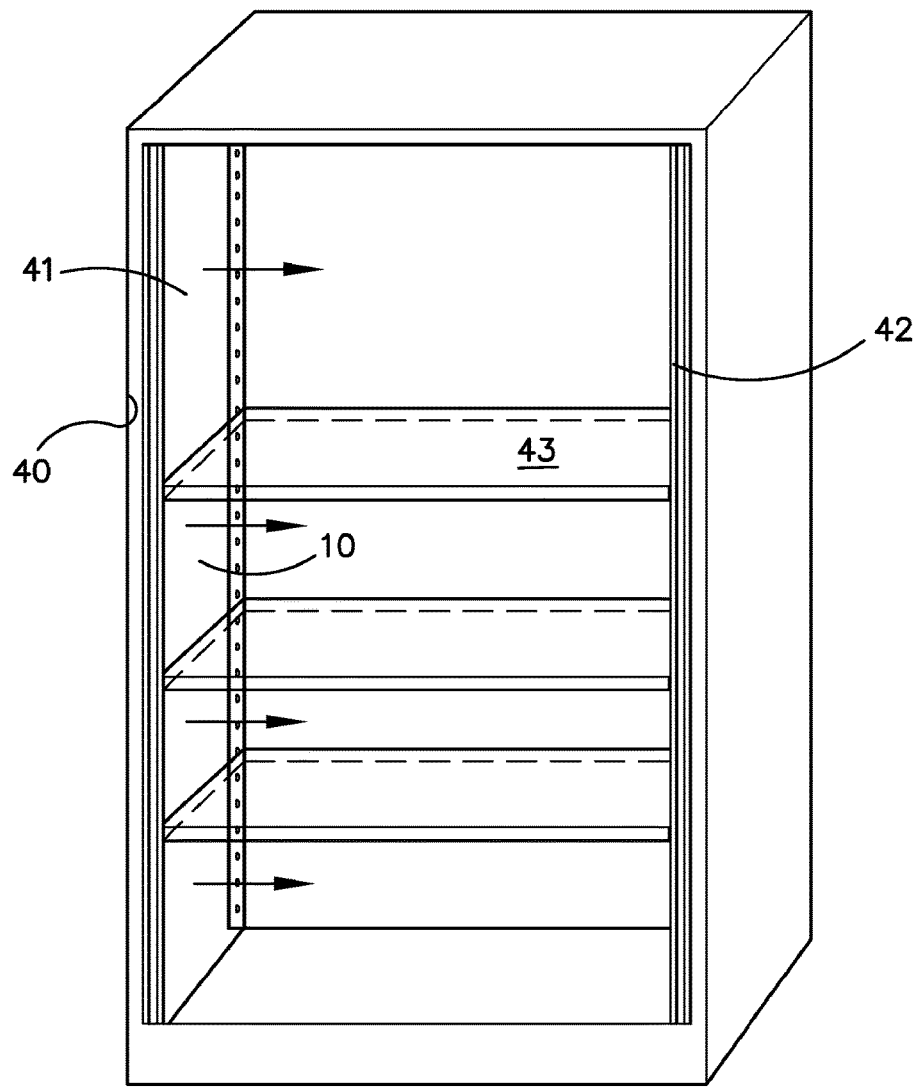
FIG. 7 is a perspective view of the interior of a refrigerator lined with panels of the kind illustrated in FIGS. 2a and 2b.

In FIG. 7, there is an illustration of an embodiment where illuminated panels 10 are incorporated as the walls of a refrigerator 40. The panels have at least one edge lined with LEDs. The core 11 is bonded to a reflecting panel or the wall of the refrigerator so that each side wall 41, 42 and rear panel 43 constitutes a light source. A translucent acrylic panel is bonded to the core to provide the hard wearing exterior surface within the interior of the refrigerator. A door operated switch (not shown) can be used to control operation of the lights. In both embodiments shown in FIGS. 5 to 7, it is understood that the shelves could incorporate illumination panels of the kind described above.

Figure 8:
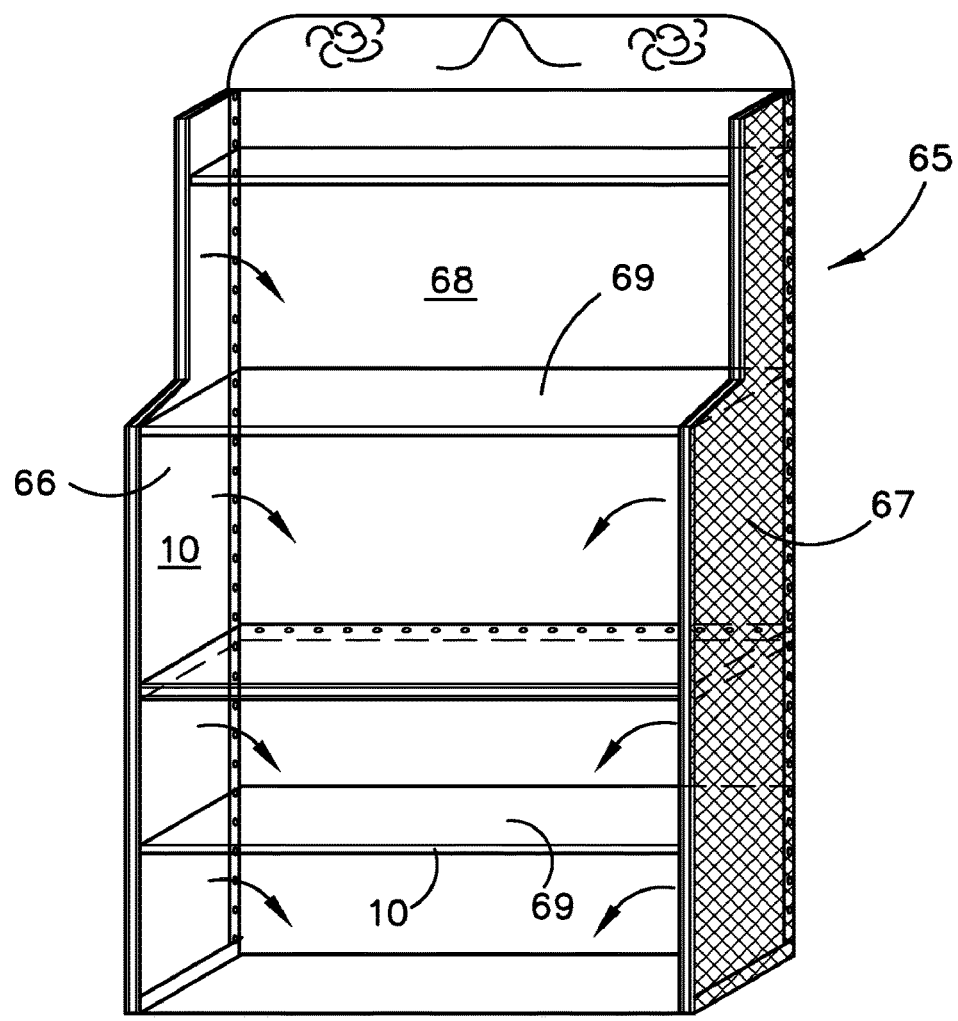
FIG. 8 is a perspective view of a retail display cabinet using illuminated walls, back panel and shelving incorporating panels shown in FIGS. 2a and 2b.

In FIG. 8, there is an illustration of a retail display 65 in which the side walls 66, 67, back panel 68 or shelving 69 could be manufactured of illuminating panels 10 of the kind described above. As described in earlier embodiments, a line of LEDs is secured along the edges of the side walls and rear wall and along one or more edges of the shelves and the core is covered on both sides by acrylic or glass panels to provide hard wearing surfaces that can be used as shelving in retail displays, or carry images and branding information.

Figure 9:
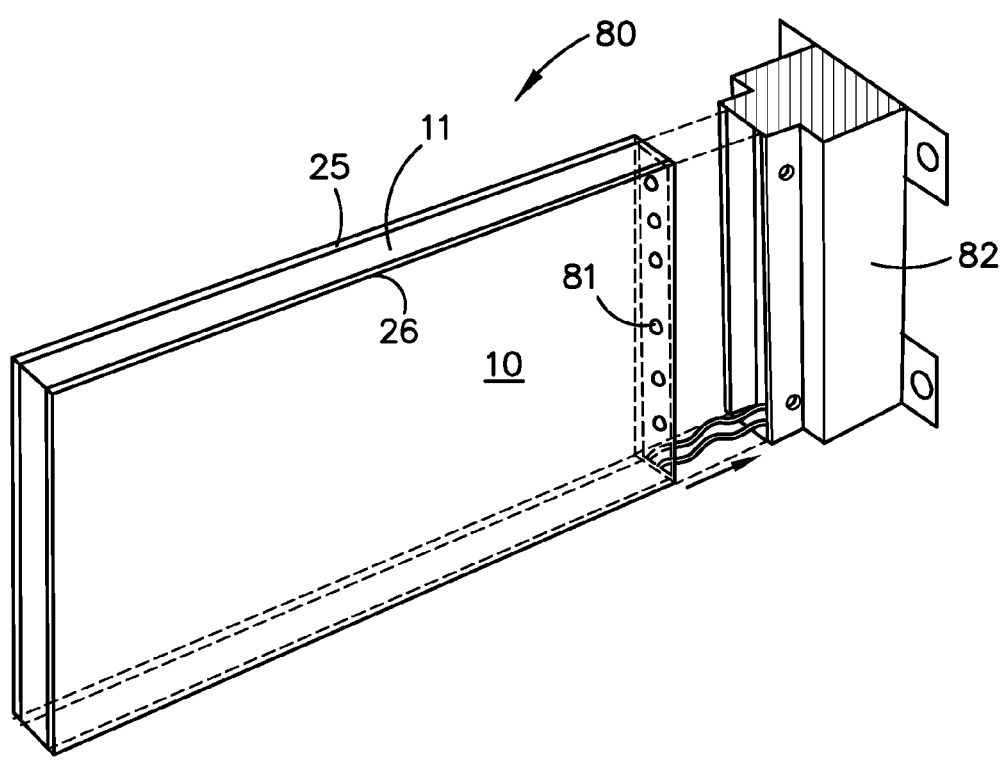
FIG. 9 is a perspective view of a street sign incorporating a panel of FIGS. 2a and 2b.

In FIG. 9, there is an illustration of a street sign 80 comprising an elongate rectangular panel 10 incorporating a core 11 and front and rear translucent acrylic faces 25, 26. The longitudinal and side edges of the panel are sealed and LED elements 81 are positioned along the inner edge. The whole assembly is attached to an aluminium extrusion 82 which forms a housing that allows the panel to attach to a post and which in turn contains a battery or transformer to power it as an illuminated street sign. The printing can be carried on either acrylic face.

Figure 10:
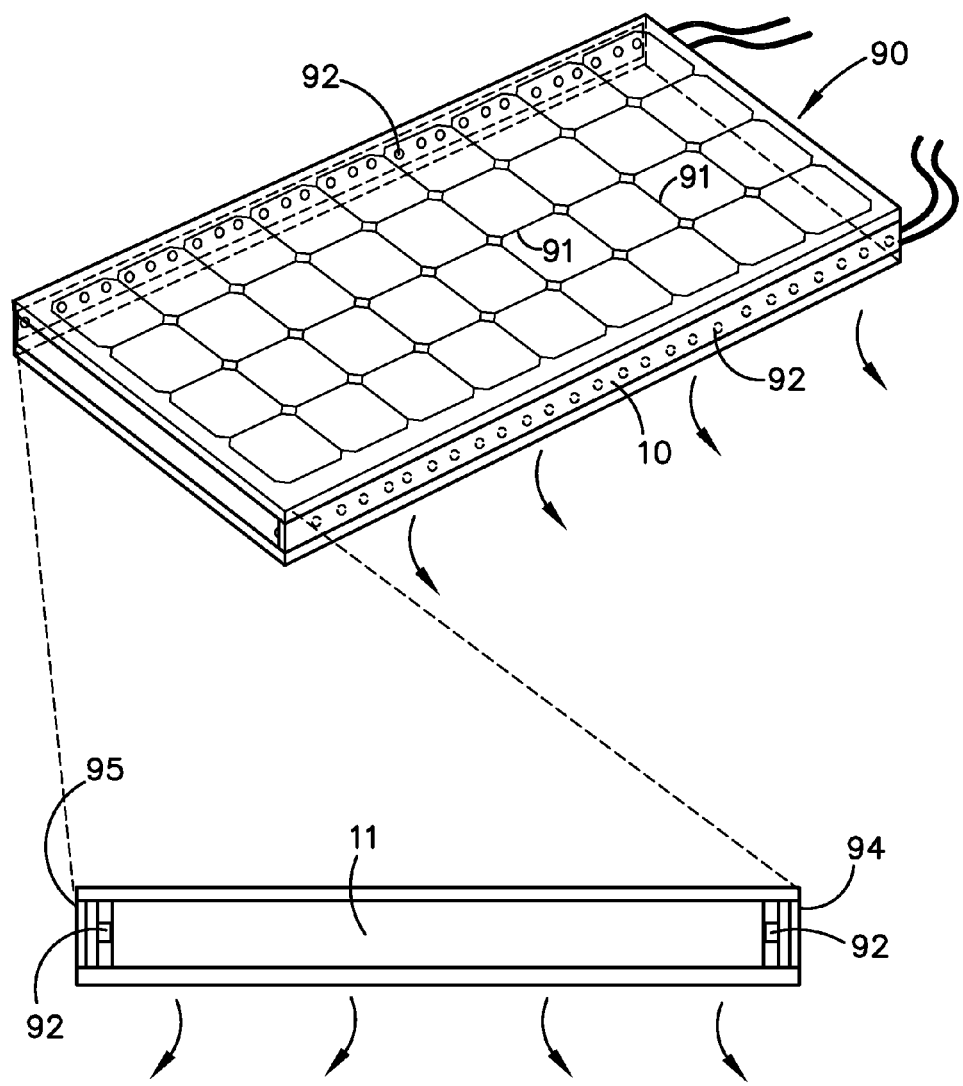
FIG. 10 is a perspective view of a solar powered panel for use with a light diffusing panel of FIGS. 2a and 2b.

In the embodiment shown in FIG. 10, a solar panel 90 incorporates an illuminated panel 10 of the kind described above whereby solar panels in the form of photo voltaic cells with a reflective under surface are bonded directly to the core, or to the exterior of the panel 10 on the top surface and they are coupled to either battery storage or battery packs which in turn power LEDs 92 positioned down the side edges of the panel. The edges of the panel can be protected with an acrylic or metal edging strip 94, 95 and, in this manner, the panel absorbs the solar energy during the day which can be stored as electricity in a battery pack ensuring that the panel is illuminated at night.

In this panel, a translucent diffuser is bonded to the core 11 to define the underside of the panel and the upper side of the panel has a reflective surface that is part of or which supports the solar panels 91.

In another embodiment, the core could comprise a series of thin panels each with appropriate positioning of adhesive dots which are in alignment or offset from the adhesive dots on the adjacent panel. In this way a laminated structure is produced with an added dimension of dot matrix refinement; in the direction horizontally away from the light source the dots may get bigger on each layer and then vertically in the direction of the light being released the dots may get proportionally smaller. Seen from the light releasing face, the dots may appear to cover the surface, but in fact they may be positioned on each layer in different positions.

In the claims which follow and in the preceding description of the invention, except where the context requires otherwise due to express language or necessary implication, the word "comprise" or variations such as "comprises" or "comprising" is used in an inclusive sense, that is, to specify the presence of the stated features but not to preclude the presence or addition of further features in various embodiments of the invention.

Having described the invention, the following is claimed:

1. An illumination panel comprising a transparent structural core having two opposing surfaces, a matrix of light releasing dots substantially covering both said opposing surfaces, and a protective panel in abutting contact with each of said opposing surfaces whereby the matrix of dots includes a pigment of between 0.5 to 2.0 wt % and is configured as a light transmitting, refracting and reflecting medium as well as an adhesive for bonding the core to the protective panels so that the illumination panel operates as a structural element without a supporting edge frame, and wherein the density or size of the dots increases across the illumination panel in a direction away from an illumination panel edge adjacent a light emitting element.

2. The illumination panel according to claim 1, wherein a transparent or translucent protective panel is bonded to both sides of the core.

3. The illumination panel according to claim 1 wherein an outer layer is bonded to the protective panel.

4. The illumination panel according to claim 3, wherein the outer layer is paint, ink, a transfer, metal, glass, plastics, wood or wood veneer.

5. The illumination panel according to claim 1, wherein the core is acrylic.

6. The illumination panel according to claim 1, wherein the light releasing dots comprise a pressure sensitive adhesive.

7. The illumination panel according to claim 1, wherein the protective panel is metal, timber, plastics or glass and can be translucent or reflective.

8. The illumination panel according to claim 1, wherein the matrix of dots is applied to the transparent core by etching, painting, screen printing, printing or spraying, or transferred from or as part of a film.

9. The illumination panel according to claim 1, wherein the matrix of dots is provided by ultrasonically welding the surface of the core to the protective panel.

10. The illumination panel according to claim 1, wherein the matrix of dots is provided by induction, dielectric or microwave activation of a distributed receptor that bonds the surface of the core to the protective panel.

11. A method of manufacturing the illumination panel according to claim 1, including the step of curing the matrix of dots by UV light or infra-red heating or laser activation to bond the surface of the core to the protective panel.

12. The illumination panel according to claim 1, wherein a reflective protective panel is bonded to one side of the core with a transparent or translucent protective panel being bonded to the other side.

13. The illumination panel according to claim 1, wherein a light is positioned adjacent or on one or more edges of the panel.

14. The illumination panel according to claim 13, wherein the light releasing dots increase along the panel in density, size or combinations thereof across the panel in a direction away from the light source.

15. The illumination panel according to claim 13 wherein the lights comprise a plurality of LEDs secured to or embedded in one or more edges of the panel.

16. A cabinet having walls and shelves, some of the walls or shelves comprising illumination panels according to claim 1 with a light source adjacent or in one or more edges of each panel.

17. A shelf comprising an illumination panel according to claim 1 with a light source adjacent or in one or more edges of the panel.

18. A sign comprising an illumination panel according to claim 1 attached to a housing having a mounting flange adapted to be secured to one edge of the illumination panel and a light positioned adjacent or on one or more edges of the panel wherein the light is wired to the interior of the housing.

19. A method of producing an illumination panel according to claim 1, the method comprising the steps of:
placing a protective panel in abutting parallel contact with a transparent structural core and
establishing a matrix of light releasing dots by applying energy through the protective panel onto the surface of the core to adhere the protective panel to the core and provide light distribution across the transparent structural core.

20. A method of producing an illumination panel according to claim 19 wherein the energy applied is chosen from laser energy, ultrasonic energy, IR energy, and microwave or electron beam energy.

21. A method of producing an illumination panel according to claim 19 which includes the further step of raising the surface energy of a surface of the transparent structural core prior to placing a protective panel in abutting parallel contact with said surf ace surface.

22. A method of producing an illumination panel according to claim 19 which includes the further step of raising the surface energy of surface of the protective panel prior to placing the protective panel in abutting parallel contact with the transparent structural core.

23. A method of producing an illumination panel according to claim 19 further including the step of:
dispensing adhesive to form the matrix of light releasing dots on the surface of the core, and subsequently
applying UV energy to activate the matrix of light releasing dots.

24. The illumination panel according to claim 1 wherein solar film or solar cells are bonded to a surface of the protective panel.

25. The illumination panel according to claim 1, wherein the pigment comprises a titanium dioxide based pigment.

26. The illumination panel according to claim 1, wherein the pigment comprises a white pigment.

* * * * *

UNITED STATES PATENT AND TRADEMARK OFFICE
CERTIFICATE OF CORRECTION

PATENT NO. : 10,243,510 B2
APPLICATION NO. : 14/729217
DATED : March 26, 2019
INVENTOR(S) : John Matyear Page 1 of 1

It is certified that error appears in the above-identified patent and that said Letters Patent is hereby corrected as shown below:

In the Specification

Column 4, Line 5, "at" should read -- al --.

Column 6, Line 33, "at" should read -- al --.

Column 7, Line 17, "1b(ii)" should read -- 1c(ii) --.

Signed and Sealed this
Sixteenth Day of July, 2019

Andrei Iancu
*Director of the United States Patent and Trademark Office*